(12) United States Patent     (10) Patent No.:   US 12,689,472 B2

Zhang et al.     (45) Date of Patent:     Jul. 21, 2026

(54) COMMUNICATION METHOD FOR IMPROVING RELIABILITY OF MBS SERVICE TRANSMISSION

(71) Applicant: JRD COMMUNICATION (SHENZHEN) LTD., Shenzhen (CN)

(72) Inventors: Xin Zhang, Shenzhen (CN); Jia Sheng, Shenzhen (CN)

(73) Assignee: JRD COMMUNICATION (SHENZHEN) LTD., Shenzhen (CN)

( * ) Notice: Subject to any disclaimer, the term of this patent is extended or adjusted under 35 U.S.C. 154(b) by 326 days.

(21) Appl. No.: 18/260,340

(22) PCT Filed: Jan. 14, 2021

(86) PCT No.: PCT/CN2021/071888
§ 371 (c)(1),
(2) Date: Jul. 5, 2023

(87) PCT Pub. No.: WO2022/151237
PCT Pub. Date: Jul. 21, 2022

(65) Prior Publication Data
US 2024/0072938 A1    Feb. 29, 2024

(51) Int. Cl.
H04L 1/1812    (2023.01)
H04L 5/00    (2006.01)
H04W 72/232    (2023.01)

(52) U.S. Cl.
CPC .......... H04L 1/1812 (2013.01); H04L 5/0053 (2013.01); H04W 72/232 (2023.01)

(58) Field of Classification Search
CPC ... H04L 1/1812; H04L 5/0053; H04L 1/1854; H04L 1/1861; H04L 1/1864; H04W 72/232
See application file for complete search history.

(56) References Cited

U.S. PATENT DOCUMENTS

2018/0115430 A1   4/2018   Seo
2020/0351032 A1*   11/2020   Wu ...................... H04W 72/56
(Continued)

FOREIGN PATENT DOCUMENTS

CN    105379318 A    3/2016
CN    107041008 A    8/2017
(Continued)

OTHER PUBLICATIONS

International Search Report in International application No. PCT/CN2021/071888, mailed on Oct. 11, 2021.
(Continued)

*Primary Examiner* — John D Blanton
(74) *Attorney, Agent, or Firm* — PV IP PC; Wei Te Chung

(57) ABSTRACT

A communication method for improving reliability of MBS service transmission performed at a UE side includes: receiving, on a physical downlink shared channel, transport blocks of an MBS service, decoding the transport blocks, and according to a decoding state and a configured feedback mode, sending a feedback to a base station, wherein the configured feedback mode is an ACK/NACK mode or a NACK mode, wherein the ACK/NACK mode is that if it is decoded correctly, ACK is fed back, or otherwise NACK is fed back, the NACK mode is that if it is determined that the feedback is all the ACK, the UE does not send ACK/NACK information, wherein if the feedback sent to the base station is NACK, receiving a retransmission of all or a part of the transport block, the retransmission is performed according to a HARQ configuration and a HARQ enablement.

19 Claims, 2 Drawing Sheets

(56) References Cited

U.S. PATENT DOCUMENTS

| | | | |
|---|---|---|---|
| 2020/0351933 A1 | 11/2020 | Nam et al. | |
| 2022/0210802 A1* | 6/2022 | Hwang | H04L 5/0053 |
| 2023/0050170 A1* | 2/2023 | Wang | H04L 1/1854 |
| 2023/0062724 A1* | 3/2023 | Zhou | H04W 72/30 |
| 2023/0063082 A1* | 3/2023 | Zhou | H04L 1/1851 |
| 2023/0239170 A1* | 7/2023 | Fan | H04L 5/0055 |
| | | | 370/329 |
| 2023/0246761 A1* | 8/2023 | Fan | H04L 1/1854 |
| | | | 370/329 |
| 2024/0072938 A1* | 2/2024 | Zhang | H04L 5/0053 |
| 2024/0097858 A1* | 3/2024 | Liu | H04W 72/25 |

FOREIGN PATENT DOCUMENTS

| | | |
|---|---|---|
| CN | 107359969 A | 11/2017 |
| CN | 107682128 A | 2/2018 |
| CN | 110830184 A | 2/2020 |
| CN | 111565089 A | 8/2020 |
| WO | 2018175084 A1 | 9/2018 |
| WO | 2020146580 A1 | 7/2020 |

OTHER PUBLICATIONS

Written Opinion of the International Search Authority in International application No. PCT/CN2021/071888, mailed on Oct. 11, 2021.

European Search Report in European application No. 21918445.4, mailed on Sep. 20, 2024.

NP1: Mediatek Inc: "Harq operation for NR MBS reliable transmission" 3GPP Draft; R2-2009126.

NP2: Interdigital Inc: "RAN2 aspects of HARQ for NR V2X" 3GPP Draft; R2-1912869.

NP3: Huawei et al:"Discussion on HARQ support for NR sidelink"3GPP Draft; R2-1913701.

Chinese Office Action issued in corresponding Chinese Patent Application No. 202180089422.9 dated May 14, 2026.

NPL1: R1-2008962, "Discussion on HARQ operation for NR MBS reliable transmission", Nov. 2, 2020.

* cited by examiner

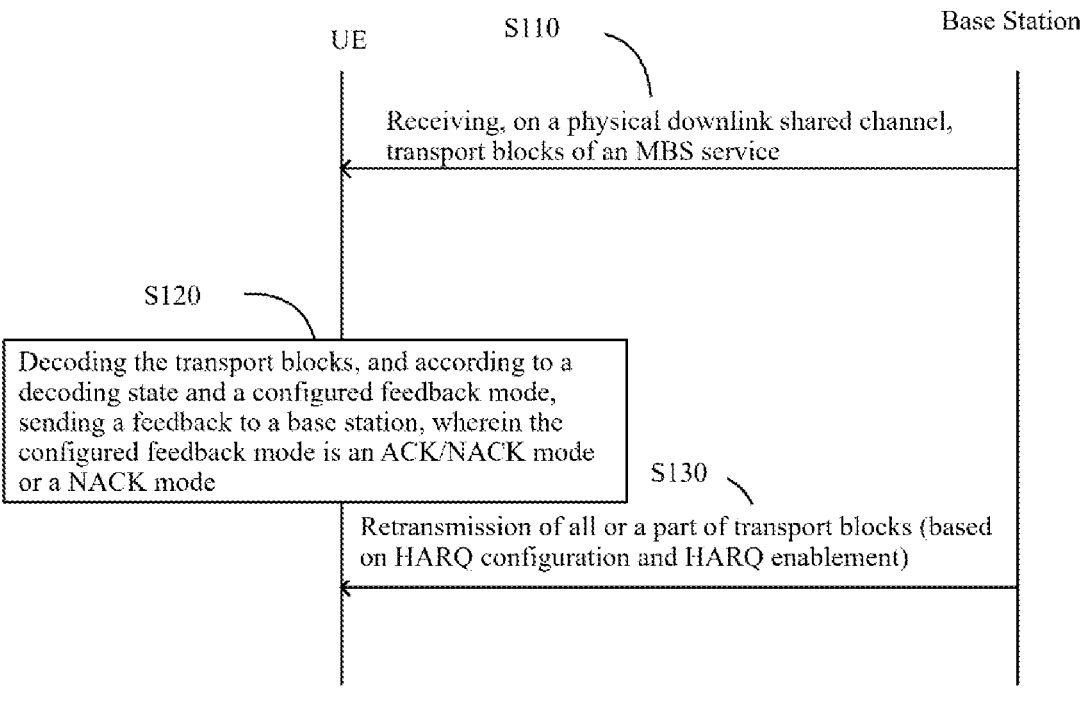

UE          S110          Base Station

Receiving, on a physical downlink shared channel, transport blocks of an MBS service

S120

Decoding the transport blocks, and according to a decoding state and a configured feedback mode, sending a feedback to a base station, wherein the configured feedback mode is an ACK/NACK mode or a NACK mode

S130

Retransmission of all or a part of transport blocks (based on HARQ configuration and HARQ enablement)

FIG. 1

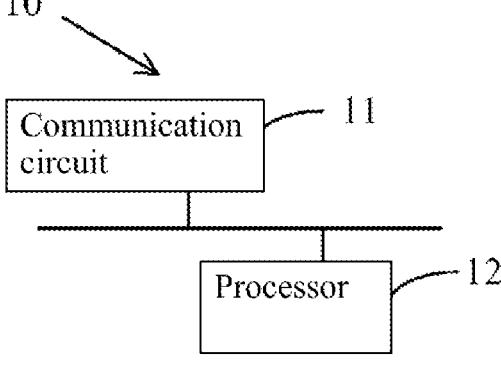

10

Communication circuit          11

Processor          12

FIG. 2

COMMUNICATION METHOD FOR IMPROVING RELIABILITY OF MBS SERVICE TRANSMISSION

CROSS REFERENCE TO RELATED APPLICATIONS

This application is a US national phase application based upon an International Application No. PCT/CN2021/071888, filed on Jan. 14, 2021, and entitled "COMMUNI-CATION METHOD FOR IMPROVING RELIABILITY OF MBS SERVICE TRANSMISSION". The entire disclosures of the above application are incorporated herein by reference.

TECHNICAL FIELD

The disclosed embodiments of the present invention relate to the technical field of MBS communication, in particular to a communication method, a user equipment, and a base station for improving reliability of MBS service transmission.

BACKGROUND

Transmission mode of Multimedia Broadcast Multicast Service (MBMS) of LTE can be divided into SC-PTM (Single Cell Point-To-Multipoint) and MBSFN (Multicast-Broadcast Single Frequency Network). In a transmission mode of SC-PTM, all MBMS services are transmitted through a physical downlink shared channel and sent to user equipment (UE) by broadcasting. If the UE is interested in this service, the UE may go to a resource location to receive the MBMS service, but the UE may not send any feedback to a base station if the UE receives the MBMS service and can decode the MBMS service successfully. Therefore, the base station may not perform any retransmission to ensure reliable transmission of services.

In the MBS services of the NR (New Radio) network, some MBS services have relatively high requirements for reliable transmission, such as V2X services. Therefore, there is a need to ensure transmission reliability in the MBS service.

SUMMARY OF INVENTION

According to the embodiments of the present invention, the communication method for improving reliability of MBS service transmission in the present invention solves the above-mentioned technical problems.

According to a first aspect of the present application, a communication method for improving reliability of MBS service transmission performed at a UE side includes: receiving, on a physical downlink shared channel, transport blocks of an MBS service; decoding the transport blocks, and according to a decoding state and a configured feedback mode, sending a feedback to a base station, wherein the configured feedback mode is an ACK/NACK mode or a NACK mode; and if the feedback is a negative feedback, receiving a retransmission of all or a part of the transport blocks, wherein the retransmission of all or the part of the transport blocks is performed by the base station according to a HARQ configuration and a HARQ enablement.

According to a second aspect of the present application, a communication method for improving reliability of MBS service transmission performed at a base station side includes: sending, on a physical downlink shared channel, transport blocks of an MBS service; receiving a feedback from the UE, wherein the feedback is formed by the UE decoding the transport blocks according to a decoding state and a configured feedback mode, the configured feedback mode is an ACK/NACK mode or a NACK mode; if the feedback is a negative feedback, performing a retransmission of all or a part of the transport blocks, wherein the retransmission of all or the part of the transport blocks is performed according to a HARQ configuration and a HARQ enablement.

According to a third aspect of the present application, a user equipment includes a processor and a communication circuit, the processor is connected to the communication circuit, and the processor is configured to execute the communication method of the first aspect.

According to a fourth aspect of the present application, a user equipment stores instructions, and when the instructions are executed, the communication method according to the first aspect is implemented.

According to a fifth aspect of the present application, a base station includes a processor and a communication circuit, the processor is connected to the communication circuit, and the processor is configured to execute the communication method of the second aspect.

According to a sixth aspect of the present application, a base station stores instructions, and when the instructions are executed, the communication method according to the second aspect is implemented.

The beneficial effects of the present application include that, in the present application, the UE receives a transport block of the MBS service on a physical downlink shared channel, decodes the transport block, and sends feedback to a base station according to a decoding state and the config-ured feedback mode. In this way, the base station can take corresponding processing according to the feedback sent by the UE. For example, when the UE fails to receive feedback, the base station can initiate retransmission of part or all of the transport block according to the received negative feed-back, so as to ensure reliable transmission of the MBS service.

BRIEF DESCRIPTION OF THE DRAWINGS

In order to illustrate the technical solutions more clearly in the embodiments of the present application, the following briefly introduces the drawings that need to be used in the description of the embodiments. Apparently, the drawings in the following description are only some embodiments of the present application. For those skilled in the art, other draw-ings can also be obtained based on these drawings without creative effort, wherein:

FIG. 1 is a schematic flowchart of a communication method according to an embodiment of the present appli-cation.

FIG. 2 is a schematic structural diagram of a user equip-ment/base station in a communication method according to an embodiment of the present application.

DETAILED DESCRIPTION OF ILLUSTRATED EMBODIMENTS

Figure 3:
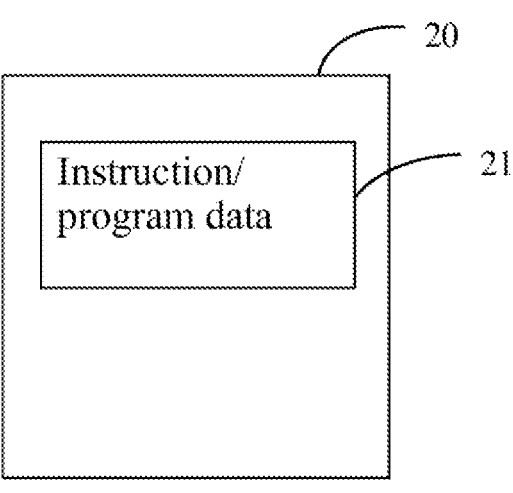
FIG. 3 is a schematic diagram of storage of a user equipment/base station in a communication method accord-ing to an embodiment of the present application.

The technical solutions in the embodiments of the present application will be clearly and completely described below in conjunction with the drawings in the embodiments of the present application. Apparently, the described embodiments are only some of the embodiments of the present application, rather than all the embodiments. Based on the embodiments in this application, all other embodiments obtained by persons of ordinary skill in the art without making creative efforts belong to the scope of protection of the present application.

The present application provides a communication method for improving reliability of MBS service transmission. Referring to FIG. 1, FIG. 1 is a schematic flowchart of a communication method according to an embodiment of the present application. The communication method includes:

S110: Receiving, on a physical downlink shared channel, transport blocks of an MBS service.

On the physical downlink shared channel, the transport block is used as a basic unit to transmit MBS data. A transport block (TB) is a data block including a MAC PDU (MAC Protocol Data Unit). This data block may be transmitted on a TTI (Transmission Time Interval). In an NR network, a TB is divided into many coding blocks (CB), and multiple CBs are grouped. The grouped CB is called CBG (Code Block Group). After the CBG is configured, the CBG may be a HARQ (Hybrid Automatic Repeat reQuest) retransmission unit. The UE receives multiple transport blocks of the MBS service data sent by the base station through the physical downlink shared channel.

S120: Decoding the transport blocks, and according to a decoding state and a configured feedback mode, sending a feedback to a base station, wherein the configured feedback mode is an ACK/NACK mode or a NACK mode.

The ACK/NACK mode is divided into two types for sending feedback, one is an ACK message, and the other is a NACK message. For example, when the UE successfully decodes the transport block, the UE can send a positive feedback ACK message indicating successful decoding to the base station. Alternatively, when the UE fails to decode the transport block, the UE may send a negative feedback NACK message indicating the decoding failure to the base station.

In the NACK mode, there is only one kind of NACK for the sent feedback. For example, when the UE fails to successfully decode the transport block, the UE may send a negative feedback NACK message indicating decoding failure to the base station, and when a block of data is successfully decoded, no message is sent.

The UE decodes the received transport block and sends feedback to the base station according to the decoding state and the configured feedback mode. The decoding state is divided into decoding success and decoding failure, and the corresponding feedback sent for these two states is different. The configured feedback mode can be configured in various ways on the network side, which is not limited here. When the configured feedback mode of the UE is the ACK/NACK mode, the UE may send ACK and NACK messages to inform the base station that the data of a transport block has been successfully decoded or not successfully decoded. When the configured feedback mode of the UE is the NACK mode, the UE may send a NACK message to inform the base station that the data of a certain transport block has not been successfully decoded.

S130: If the feedback is a negative feedback, receiving a retransmission of all or a part of the transport blocks, wherein the retransmission of all or the part of the transport blocks is performed by the base station according to a HARQ configuration and a HARQ enablement.

The base station can take corresponding processing through the feedback sent by the UE. If the feedback from the UE is negative feedback, the base station can initiate retransmission of part or all of the transport blocks that fail to be decoded. The CBG configured as above may be a HARQ retransmission unit. If CBG is not configured, TB is still used as the retransmission unit for retransmission. That is, the base station can retransmit the CBG (partial transport block) or transport block that fails to be received. The retransmission is performed according to the HARQ configuration and HARQ enablement. The HARQ configuration may include time domain resources occupied by retransmission, frequency domain resources occupied, etc. HARQ enable is whether to enable or disable the retransmission mechanism. It can be understood that, when the feedback mode is the ACK/NACK mode, the base station may adopt the HARQ mechanism based on ACK/NACK feedback. When the feedback mode is the NACK mode, the base station may adopt a NACK feedback-based HARQ mechanism.

In the present application, the UE receives the transport block of the MBS service on the physical downlink shared channel, decodes the transport block, and sends feedback to the base station according to the decoding state and the configured feedback mode, so that the base station can take corresponding processing according to the feedback sent by the UE. For example, when the UE feedbacks that reception fails, the base station can initiate retransmission for some or all transport blocks according to the received negative feedback, so as to ensure reliable transmission of the MBS service.

In an embodiment, the feedback ACK message or NACK message sent by the UE may be transmitted through the feedback resource of the physical uplink control channel. The feedback resource of the physical uplink control channel may share the same feedback resource of the physical uplink control channel as the unicast service. It may also not share the same feedback resource of the physical uplink control channel as unicast. Instead, the feedback resource of the physical uplink control channel is further defined as the feedback resource of the physical uplink control channel dedicated to the unicast service and the feedback resource of the physical uplink control channel dedicated to the MBS service. Feedback is transmitted through the feedback resource of the physical uplink control channel dedicated to the MBS service.

In the ACK/NACK-based mode, each UE sends an ACK message or a NACK message using a feedback resource of an independent physical uplink control channel, so that the base station can distinguish the type of the feedback message sent by each UE.

In the NACK-based mode, each UE may use its own independent physical uplink control channel feedback resource or share the same physical uplink control channel feedback resource for sending the NACK message. When each UE sends a NACK message using its own independent physical uplink control channel resources, the base station can distinguish which UE sent the NACK feedback after receiving the NACK message. The base station may choose to retransmit only for the UE. If only one UE in the group sends a NACK message, and this UE is at the edge of the cell, the base station can only perform one-to-one retransmission for this UE. In this way, the base station saves resources for initiating retransmission. When multiple UEs send NACK messages and share the same feedback resource of the physical uplink control channel, this can save the resource of the transmission channel occupied by the feedback.

As mentioned above, the feedback mode configured by the UE is configured by the network side. In an embodiment, the configuration of the feedback mode may be determined by the number of UEs in the group. When the number of UEs in the group is less than the preset threshold value, the configuration of the feedback mode is the ACK/NACK mode. When the number of UEs in the group is greater than or equal to the preset threshold value, the configuration of the feedback mode is NACK mode. In this manner, when the number of UEs is large, multiple UEs only send NACK feedback, so that fewer feedback resources are occupied. When the number of UEs is small, multiple UEs sending ACK or NACK feedback may not occupy too many feedback resources.

As mentioned above, the feedback mode configured by the UE is configured by the network side. In an embodiment, the configuration of the feedback mode may be configured through an RRC (Radio Resource Control) setting IE (Information Element). For example, the configuration IE of the feedback mode is as follows:

```
MBS-Feedback-Config::=  SEQUENCE{
  MBS-HARQ-Mode       ENUMERATED{ACK/NACK,NACK-
only}
  OPTIONAL,  --Need M
```

It can be seen from the above that an IE of "MBS-HARQ-Mode" is set in RRC to configure the feedback mode as ACK/NACK or NACK-only.

As mentioned above, the feedback mode configured by the UE is configured by the network side. In an embodiment, the configuration of the feedback mode may be configured by adding a new logical channel identifier to a MAC CE (MAC Control Element). This new logical channel identifier may be added in Table 6.2.1-1 in TS 38.321 as follows:

TABLE 6.2.1-1

| Values of LCID for downlink shared channel | |
| --- | --- |
| Index | LCID values |
| 0 | CCCH |
| 1-32 | Identity of the logical channel |
| 33 | Extended LCID field (two-octet eLCID field) |
| 34 | Extended LCID field (one-octet eLCID field) |
| 35-46 | Reserved |
| 47 | Recommended bit rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for UE-specific PDCCH |
| 53 | TCI States Activation/Deactivation for UE-specific PDSCH |
| 54 | Aperiodic CSI Trigger State Subselection |
| 55 | SP CSI-RS/CSI-IM Resource Set Activation/Deactivation |
| 56 | Duplication Activation/Deactivation |
| 57 | Cell Activation/Deactivation (four octets) |
| 58 | Cell Activation/Deactivation (one octet) |
| 59 | Long DRX Command |
| 60 | DRX Command |
| 61 | Timing Advance Command |
| 62 | UE Contention Resolution Identity |
| 63 | Reserved |

It can be seen from the above table that the index value 63 or index values 35-46 are temporarily reserved. The logical channel ID with an index value of 63 or optional index values from 35 to 46 can be defined as "MBS HARQ Mode" to configure the feedback mode.

Optionally, the new logical channel identifier can also be increased in table 6.2.1-1a of TS 38.321, as shown in the following table:

TABLE 6.2.1-1a

| Values of two-octet eLCID for downlink shared channel | | |
| --- | --- | --- |
| Codepoint | Index | LCID values |
| 0 to $(2^{16} - 1)$ | 320 to $(2^{16} + 319)$ | Identity of the logical channel |

It can be known from the above table that the index value 320 to $(2^{16}+319)$ is reserved for logical channel identification. An index value can be selected from 320 to $(2^{16}+319)$ for feedback mode selection. Define the logical channel ID of the selected index value as "MBS HARQ Mode" to configure the feedback mode.

Optionally, the new logical channel identifier can also be increased in table 6.2.1-1b of TS 38.321, as shown in the following table:

TABLE 6.2.1-1b

| Values of one-octet eLCID for downlink shared channel | | |
| --- | --- | --- |
| Codepoint | Index | LCID values |
| 0 to 244 | 64 to 308 | Reserved |
| 245 | 309 | Serving Cell Set based SRS Spatial Relation Indication |
| 246 | 310 | PUSCH Pathloss Reference RS Update |
| 247 | 311 | SRS Pathloss Reference RS Update |
| 248 | 312 | Enhanced SP/AP SRS Spatial Relation Indication |
| 249 | 313 | Enhanced PUCCH Spatial Relation Activation/Deactivation |
| 250 | 314 | Enhanced TCI States Activation/Deactivation for UE-specific PDSCH |
| 251 | 315 | Duplication RLC Activation/Deactivation |
| 252 | 316 | Absolute Timing Advance Command |
| 253 | 317 | SP Positioning SRS Activation/Deactivation |
| 254 | 318 | Provided Guard Symbols |
| 255 | 319 | Timing Delta |

It can be known from the above table that the index values of 64 to 308 are the reserved logical channel identifier. An index value can be selected arbitrarily from 64 to 308. Define its logical channel ID as "MBS HARQ Mode" to configure the feedback mode.

As mentioned above, the logical channel ID is added to "MB S HARQ Mode" through the MAC CE. There is no limit to the number of octets of the MAC CE, which can be 1 to N octets, as illustrated in the following table.

| $D_7$ | $D_6$ | $D_5$ | $D_4$ | $D_3$ | $D_2$ | $D_1$ | $D_0$ |
| --- | --- | --- | --- | --- | --- | --- | --- |

For example, when the MAC CE is 1 octet, when $D_0=1$, it means ACK/NACK, and when $D_0=0$, it means NACK-only.

As mentioned above, the feedback mode configured by the UE is configured by the network side. In an embodiment, the configuration of the feedback mode is configured by using an indication field in downlink control information (DCI). For example, 1 bit in the DCI may be used to indicate the feedback mode. The DCI message carrying the feedback mode can be sent through broadcast control channel, paging control channel, or MBS control channel. The UE can monitor the paging control channel through P-RNTI (Paging-Radio Network Temporary Identity) or monitor the MBS control channel through the RNTI for the MBS control channel, so as to receive the DCI message including the feedback mode.

As mentioned above, when the base station side receives the feedback message sent based on the ACK/NACK mode or the NACK mode, it takes corresponding processing according to the type of the feedback message. For example, when receiving an ACK message, the base station does not perform any retransmission, and when receiving the NACK message, the base station initiates the retransmission of the MBS service. It can be understood that this is the feedback-based HARQ mechanism.

In an embodiment, the HARQ mechanism needs to be executed according to a specific HARQ configuration, and the HARQ configuration may include time-domain resources and frequency-domain resources occupied by retransmission. The HARQ configuration can be default or preset. The preset HARQ configuration is invoked each time. It is understood that the HARQ configuration can also be configured by adding an IE through the RRC. For example, the IE of the added HARQ configuration is as follows:

```
MBS-Feedback-Config::=  SEQUENCE{
    MBS - HARQ - Mode  ENUMERATED{ACK/NACK, NACK-only}
OPTIONAL,  --Need M
MBS - HARQ - TimeResource  ENUMERATED{ n1, n2}
OPTIONAL,  --Need M
MBS - HARQ - FreqResource   ENUMERATED{n10, n12, n20, n25 }
OPTIONAL,  --Need M
```

Optionally, the HARQ configuration may also be configured through the MAC CE. For example, select Table 6.2.1-1, Table 6.2.1-1a, or Table 6.2.1-1b in TS 38.321 as the reserved index value to define the time domain resources and frequency domain resources occupied by retransmission. It is understood that, if the index value has been defined as the choice of the feedback mode, other reserved index values can be selected for definition.

Optionally, the HARQ configuration may also be configured through a DCI message, and one or more fields of the DCI message are defined as time domain resources and frequency domain resources occupied by retransmission configuration.

In another embodiment, the HARQ enabling function may also be indicated in the following manner.

The enable indication can be configured by adding an IE to RRC. For example, the IE of the added enable indication is as follows:

```
        MBS-LogicalChannelConfig-r16::=  SEQUENCE{
        MBS-HARQ-FeddbackEnabled-r17
        ENUMERATED{enabled,disabled}
            OPTIONAL,  --Need R
```

Optionally, the enabling indication may also be configured through MAC CE. For example, select Table 6.2.1-1, Table 6.2.1-1a, or Table 6.2.1-1b in TS 38.321 as the reserved index value to define the time domain resources and frequency domain resources occupied by retransmission. It is understood that if the index value has been defined as the feedback mode or HARQ configuration, other reserved index values may be selected for definition.

Optionally, the enabling indication configuration may also be configured through a DCI message, and one or more fields of the DCI message are defined as the enabling indication. Referring to FIG. 2, FIG. 2 is a schematic structural diagram of a user equipment or a base station according to an embodiment of the present application. The user equipment 10 includes a processor 12 and a communication circuit 11. The processor 12 is connected to the communication circuit 11, and the processor 12 is used to execute instructions to implement the above communication method.

The processor 12 may also be referred to as a CPU (Central Processing Unit). The processor 12 may be an integrated circuit chip with signal processing capabilities. The processor 12 can also be a general-purpose processor, a digital signal processor (DSP), an application-specific integrated circuit (ASIC), a field-programmable gate array (FPGA) or other programmable logic devices, discrete gate or transistor logic devices, discrete hardware components. The general purpose processor may be a microprocessor or the processor 12 may be any conventional processor or the like.

Referring to FIG. 3, FIG. 3 is a schematic diagram of a storage of a user equipment or a base station according to an embodiment of the present application. A storage medium 20 of the user equipment or the base station in the embodiment of the present application stores instruction/program data 21. When the instruction/program data 21 is executed, the method provided by any embodiment of the communication method of the present application and any non-conflicting combination is realized. The instruction/program data 21 can form a program file and be stored in the above-mentioned storage medium 20 in the form of a software product, so that a computer device (which can be a personal computer, a server, or a network device, etc.) or a processor (processor) executes all or part of the steps of the methods in the various implementation manners of the present application. The aforementioned storage medium 20 includes U disk, mobile hard disk, read-only memory (ROM), random access memory (RAM), magnetic disk or optical disk and other media that can store program codes, or terminal device such as computer, server, mobile phone, and tablet.

In the several embodiments provided in the present application, it should be understood that the disclosed system, device, and method can be implemented in other ways. For example, the device embodiments described above are illustrative only. For example, the division of units is only a logical function division, and there may be another division method in actual implementation. For example, several units or components may be combined or may be integrated into another system, or some features may be omitted, or not implemented. In another point, the mutual coupling or direct coupling or communication connection shown or discussed may be through some interfaces, and the indirect coupling or communication connection of devices or units may be in electrical, mechanical or other forms.

In addition, each functional unit in each embodiment of the present application may be integrated into one processing unit, each unit may exist separately physically, or two or more units may be integrated into one unit. The above-mentioned integrated units can be implemented in the form of hardware or in the form of software functional units.

The above are only the implementation manners of the present application and are not intended to limit the patent scope of the present application. Any equivalent structure or equivalent process transformation made by using the contents of the specification and drawings of the present application, or directly or indirectly used in other related technical fields, is also included in the scope of patent protection of the present application.

What is claimed is:

1. A communication method for improving reliability of MBS service transmission performed at a UE side, comprising:

receiving, on a physical downlink shared channel, transport blocks of an MBS service;

decoding the transport blocks, and according to a decoding state and a configured feedback mode, sending a feedback to a base station, wherein the configured feedback mode is an ACK/NACK mode or a NACK mode; wherein the ACK/NACK mode is that if it is decoded correctly, ACK is fed back, or otherwise NACK is fed back, the NACK mode is that if it is determined that the feedback is all the ACK, the UE does not send ACK/NACK information;

wherein the configured feedback mode is determined according to a number of UEs in a group, when the number of UEs in the group is less than a preset threshold value, the configured feedback mode is the ACK/NACK mode, and the UE uses feedback resources of independent physical uplink control channels to send the ACK or the NACK to the base station; and when the number of UEs in the group is greater than or equal to the preset threshold value, the configured feedback mode is the NACK mode, and the UE shares the same feedback resource of the physical uplink control channel to send the NACK to the base station;

wherein if the feedback sent to the base station is NACK, receiving a retransmission of all or a part of the transport block, the retransmission is performed according to a HARQ configuration and a HARQ enablement; wherein the HARQ enablement is configured by adding an information element through a radio resource control, configured by adding a logical channel identifier through a control element of a media access control, or configured through an indication field in a downlink control information.

2. The communication method according to claim 1, wherein sending the feedback to the base station further comprises:

sending the feedback to the base station through a feedback resource of a physical uplink control channel.

3. The communication method according to claim 2, wherein the feedback resource of the physical uplink control channel shares the same feedback resource of the physical uplink control channel as a unicast service.

4. The communication method according to claim 2, wherein the feedback resource of the physical uplink control channel is configured separately, and the feedback resource of the physical uplink control channel is not shared with a unicast service.

5. The communication method according to claim 2, wherein the UE uses feedback resources of independent physical uplink control channels to send the ACK or the NACK to the base station.

6. The communication method according to claim 2, wherein the UE uses feedback resources of independent physical uplink control channels to send the NACK to the base station, or the UE shares the same feedback resource of the physical uplink control channel to send the NACK to the base station.

7. The communication method according to claim 1, wherein according to the configured feedback mode, sending the feedback to the base station further comprises:

a configuration of the feedback mode is determined by a number of UEs in a group, when the number of UEs in the group is less than a preset threshold value, the configuration of the feedback mode is the ACK/NACK mode; when the number of UEs in the group is greater than or equal to the preset threshold value, the configuration of the feedback mode is the NACK mode.

8. The communication method according to claim 7, wherein the configuration of the feedback mode is configured by adding an information element through a radio resource control, configured by adding a logical channel identifier through a control element of a media access control, or configured through an indication field in a downlink control information.

9. The communication method according to claim 1, wherein the HARQ configuration is configured by adding an information element through a radio resource control, configured by adding a logical channel identifier through a control element of a media access control, or configured through an indication field in a downlink control information.

10. A communication method for improving reliability of MBS service transmission performed at a base station side, comprising:

sending, on a physical downlink shared channel, transport blocks of an MBS service;

receiving a feedback from the UE, wherein the feedback is formed by the UE decoding the transport blocks according to a decoding state and a configured feedback mode, the configured feedback mode is an ACK/NACK mode or a NACK mode;

wherein the ACK/NACK mode is that if it is decoded correctly, ACK is fed back, or otherwise NACK is fed back, the NACK mode is that if it is determined that the feedback is all the ACK, the UE does not send ACK/NACK information;

wherein the base station determines a configured feedback mode according to a number of UEs in a group, when the number of UEs in the group is less than a preset threshold value, the configured feedback mode is an ACK/NACK mode, and the base station configures feedback resources of independent physical uplink control channels for the UEs to respectively transmit ACKs or NACKs; and when the number of UEs in the group is greater than or equal to the preset threshold value, the configured feedback mode is a NACK mode, and the base station configures the UEs to share a same feedback resource of a physical uplink control channel for transmitting NACKs;

wherein if the feedback received by the base station is NACK, sending a retransmission of all or a part of the transport block, the retransmission is performed according to a HARQ configuration and a HARQ enablement; wherein the HARQ enablement is configured by adding an information element through a radio resource control, configured by adding a logical channel identifier through a control element of a media access control, or configured through an indication field in a downlink control information.

11. The communication method according to claim 10, wherein receiving the feedback from the UE further comprises:

receiving the feedback from the UE through a feedback resource of a physical uplink control channel.

12. The communication method according to claim 11, wherein the feedback resource of the physical uplink control channel shares the same feedback resource of the physical uplink control channel as a unicast service.

13. The communication method according to claim 11, wherein the feedback resource of the physical uplink control channel is configured separately, and the feedback resource of the physical uplink control channel is not shared with a unicast service.

14. The communication method according to claim 11, wherein the base station receives the ACK or the NACK sent from the UE using feedback resources of independent physical uplink control channels.

15. The communication method according to claim 11, wherein the base station receives the NACK sent from the UE using feedback resources of independent physical uplink control channels, or receiving the NACK sent from the UE sharing the same feedback resource of the physical uplink control channel.

16. The communication method according to claim 10, wherein according to the configured feedback mode, sending the feedback to the base station further comprises:

a configuration of the feedback mode is determined by a number of UEs in a group, when the number of UEs in the group is less than a preset threshold value, the configuration of the feedback mode is the ACK/NACK mode; when the number of UEs in the group is greater than or equal to the preset threshold value, the configuration of the feedback mode is the NACK mode.

17. The communication method according to claim 10, wherein the configuration of the feedback mode is configured by adding an information element through a radio resource control, configured by adding a logical channel identifier through a control element of a media access control, or configured through an indication field in a downlink control information.

18. The communication method according to claim 10, wherein the HARQ configuration is configured by adding an information element through a radio resource control, configured by adding a logical channel identifier through a control element of a media access control, or configured through an indication field in a downlink control information.

19. A user equipment, comprising a processor and a communication circuit, wherein the processor is connected to the communication circuit;

wherein the user equipment is configured to:

receive, on a physical downlink shared channel, transport blocks of an MBS service;

decode the transport blocks, and according to a decoding state and a configured feedback mode, send a feedback to a base station, wherein the configured feedback mode is an ACK/NACK mode or a NACK mode; wherein the ACK/NACK mode is that if it is decoded correctly, ACK is fed back, or otherwise NACK is fed back, the NACK mode is that if it is determined that the feedback is all the ACK, the user equipment does not send ACK/NACK information;

wherein the configured feedback mode is determined according to a number of UEs in a group, when the number of UEs in the group is less than a preset threshold value, the configured feedback mode is the ACK/NACK mode, and the UE uses feedback resources of independent physical uplink control channels to send the ACK or the NACK to the base station; and when the number of UEs in the group is greater than or equal to the preset threshold value, the configured feedback mode is the NACK mode, and the UE shares the same feedback resource of the physical uplink control channel to send the NACK to the base station;

wherein the ACK/NACK mode is that if it is decoded correctly, ACK is fed back, or otherwise NACK is fed back, the NACK mode is that if it is determined that the feedback is all the ACK, the UE does not send ACK/NACK information; wherein if the feedback sent to the base station is NACK, receiving a retransmission of all or a part of the transport block, the retransmission is performed according to a HARQ configuration and a HARQ enablement; wherein the HARQ enablement is configured by adding an information element through a radio resource control, configured by adding a logical channel identifier through a control element of a media access control, or configured through an indication field in a downlink control information.

\* \* \* \* \*